(12) United States Patent
Szumer

(10) Patent No.: US 7,047,654 B2
(45) Date of Patent: May 23, 2006

(54) RETAINER CLIPS FOR SECURING A CYLINDRICAL LEVEL VIAL

(75) Inventor: Emanuel Szumer, Buderim (AU)

(73) Assignee: Kapro Industries Ltd., MP Bikat Beit Hakarem (IL)

( * ) Notice: Subject to any disclaimer, the term of this patent is extended or adjusted under 35 U.S.C. 154(b) by 0 days.

(21) Appl. No.: 10/511,704

(22) PCT Filed: Apr. 8, 2003

(86) PCT No.: PCT/IL03/00294

§ 371 (c)(1),
(2), (4) Date: Oct. 15, 2004

(87) PCT Pub. No.: WO03/089880

PCT Pub. Date: Oct. 30, 2003

(65) Prior Publication Data

US 2005/0144796 A1    Jul. 7, 2005

(30) Foreign Application Priority Data

Apr. 22, 2002    (IL)    ..................... 149274

(51) Int. Cl.
*G01C 9/28*    (2006.01)
(52) U.S. Cl. ......................... 33/379; 33/381

(58) Field of Classification Search .......... 33/379–390
See application file for complete search history.

(56) References Cited

U.S. PATENT DOCUMENTS

| | | | | | |
|---|---|---|---|---|---|
| 901,953 | A | * | 10/1908 | Couture | 33/383 |
| 1,323,148 | A | * | 11/1919 | Belleville | 33/388 |
| 1,380,611 | A | * | 6/1921 | Walker | 33/385 |
| 2,468,215 | A | * | 4/1949 | Leiger | 33/384 |
| 3,456,354 | A | | 7/1969 | Wright | 33/379 |
| 3,871,110 | A | * | 3/1975 | Gutowski et al. | 33/379 |
| 3,878,618 | A | * | 4/1975 | Freeman | 33/379 |
| 4,292,741 | A | * | 10/1981 | Scandella | 33/379 |
| 4,335,524 | A | * | 6/1982 | Schimming | 33/388 |
| 4,534,117 | A | * | 8/1985 | Haefner et al. | 33/379 |
| 4,542,592 | A | * | 9/1985 | Hopkins | 33/386 |
| 4,571,845 | A | | 2/1986 | Wright et al. | 33/379 |
| 4,685,219 | A | * | 8/1987 | Haefner et al. | 33/379 |
| 4,908,949 | A | * | 3/1990 | Jaccard | 33/390 |
| 5,111,589 | A | * | 5/1992 | Tate | 33/385 |
| 2004/0098874 | A1 | * | 5/2004 | Liao | 33/384 |
| 2005/0160610 | A1 | * | 7/2005 | Scheyer | 33/379 |

* cited by examiner

*Primary Examiner*—G. Bradley Bennett
(74) *Attorney, Agent, or Firm*—Nath & Associates PLLC; Harold L. Novick

(57) ABSTRACT

Hand tool (1) including a pair of retainer clips (7A,7B) for securing a cylindrical level vial (6) in a suitable recess (3), and method of assembly therefor.

2 Claims, 2 Drawing Sheets

RETAINER CLIPS FOR SECURING A CYLINDRICAL LEVEL VIAL

FIELD OF THE INVENTION

The invention is in the field of hand tools with spirit level functionality in general, and hand tools with one or more cylindrical level vials providing their spirit level functionality in particular.

BACKGROUND OF THE INVENTION

Hand tools with spirit level functionality typically include either low end cylindrical level vials with reading lines on their exterior surfaces or high end machined acrylic blocks with barrel shaped level vials having reading lines on their interior surfaces. Cylindrical level vials are typically of the injected molded acrylic type which have now largely superseded the conventional glass blown type. Cylindrical level vials are typically secured in hand tools by way of either one of two conventional assembly techniques as follows: First, a snap-fit arrangement as illustrated and described in U.S. Pat. No. 4,571,845 to J. Wright, et al entitled "*Polycast Level Instruments with Means for Retaining Level Vials Therein*". And second, by gluing.

SUMMARY OF THE INVENTION

The present invention is for a hand tool having a pair of retainer clips for securing a cylindrical level vial in a suitable recess prepared in its web. The recess preferably snugly accommodates a cylindrical level vial both lengthwise and diameterwise, thereby ensuring correct orientation of the level vial with respect to the hand tool. The present invention is particularly suitable for a wide range of plastic molded or metal casted hand tools whose web thickness can be readily controlled during manufacturing. The main purpose of the hand tools may not necessarily be for use as a spirit level but are additionally provided with spirit level functionality for user convenience.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DESCRIPTION OF PREFERRED EMBODIMENTS

Figure 1:
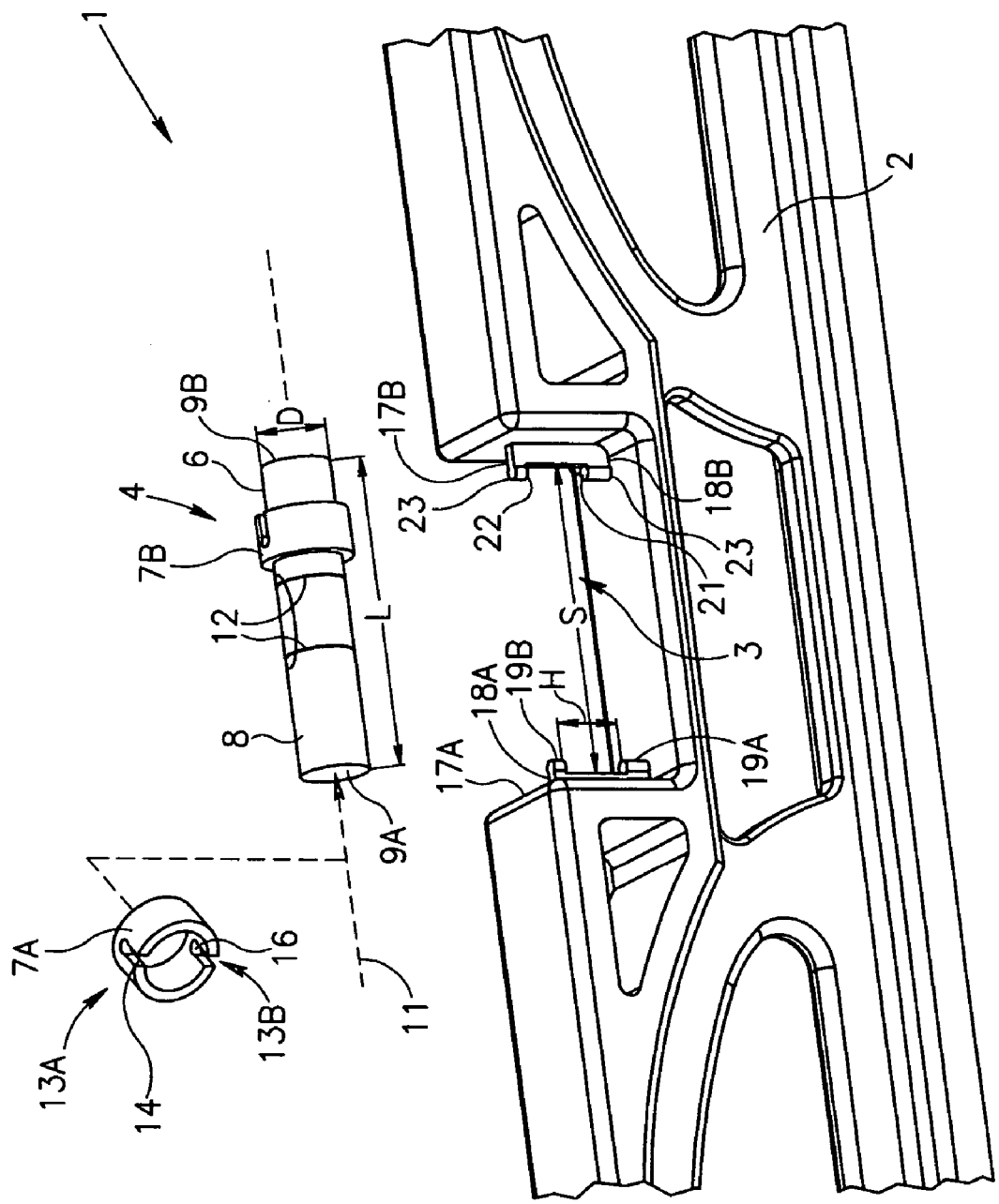
FIG. 1 is a perspective close-up view of a portion of a spirit level and a partially dissembled level vial assembly for use therewith in accordance with the present invention.

FIG. 1 is a close-up view of a portion of a plastic molded spirit level 1 (constituting a hand tool with spirit level capability) including a web 2 formed with a recess 3 for receiving a level vial assembly 4 for horizontal leveling purposes. The level vial assembly 4 includes a cylindrical level vial 6 and a pair of annular retainer clips 7A and 7B for securely mounted the level vial 6 in the recess 3. The level vial 6 has a cylindrical exterior surface 8, a pair of opposite end walls 9A and 9B, and a longitudinal axis 11. The level vial 6 has a length L and a diameter D. The exterior surface 8 is provided with a pair of reading lines 12 for providing a visual indication as to whether the level vial 6 is horizontally aligned along its longitudinal axis 11. Each retainer clip 7 is slidable along the level vial 6, and has a pair of identical notches 13A and 13B each having a narrow neck 14 widening into a horseshoe shaped recess 16.

The recess 3 has a pair of opposite side walls 17A and 17B respectively provided with vial supports 18A and 18B each formed with identical lower and upper lugs 19A and 19B respectively having an upper surface 21 and a lower surface 22. The separation S between a recess's opposite vial supports 18A and 18B is only slightly greater than the level vial's length L whereby a level vial 6 is snugly lengthwise accommodated therebetween. The height H between the lower lugs' upper surfaces 21 and the upper lugs' lower surfaces 22 is only slightly greater than a level vial's diameter D whereby a level vial 6 is snugly diameterwise accommodated therebetween. The lower lugs 19A and upper lugs 19B are formed with widened tips 23 for a snap-fit arrangement in a retainer clip's recesses 16.

Figure 2:
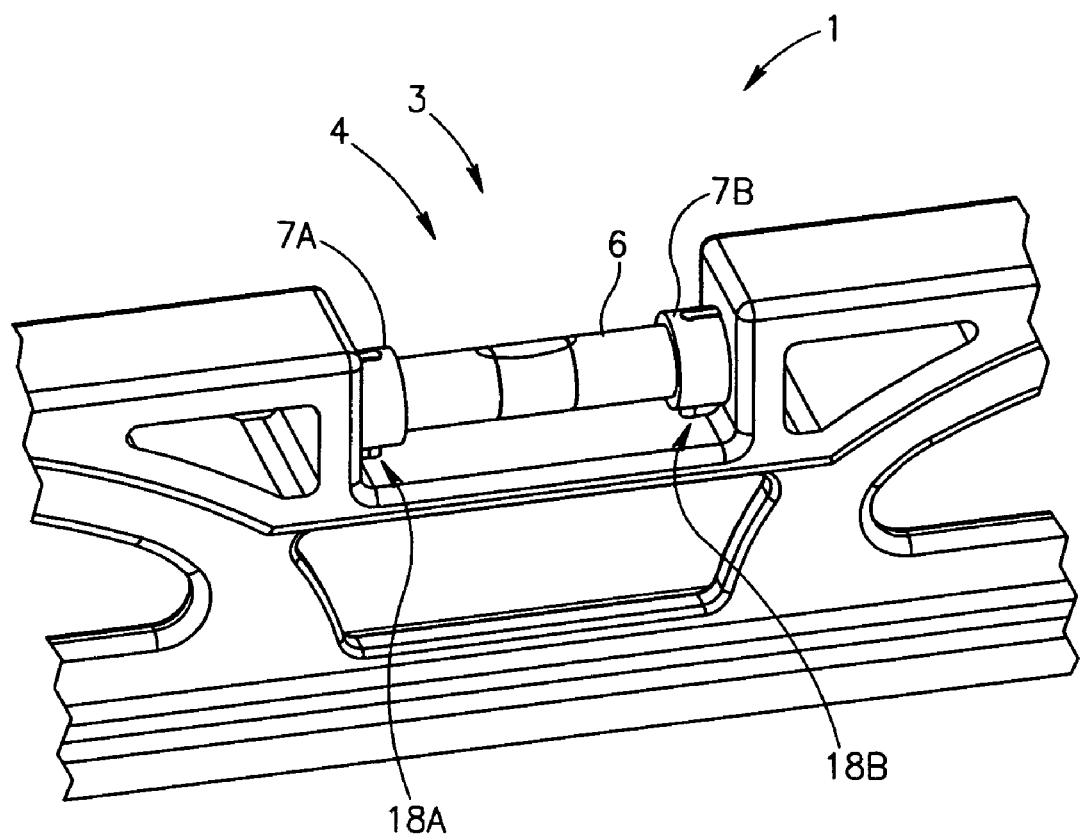
FIG. 2 is a perspective close-up view of the portion of the spirit level of FIG. 1 with the assembled level vial assembly mounted therein.

The method of assembly of the spirit level 1 is as follows:

The two retainer clips 7A and 7B are slid toward the middle of the level vial 6. The assembled level vial assembly 4 is inserted into the recess 3 from the side so as to be snugly accommodated therein both lengthwise and diameterwise. The retainer clips 7A and 7B are displaced away one from the other until the retainer clip 7A snap fits onto the vial support 18A and the retainer clip 7B snap fits onto the vial support 18B (see FIG. 2).

Figure 3:
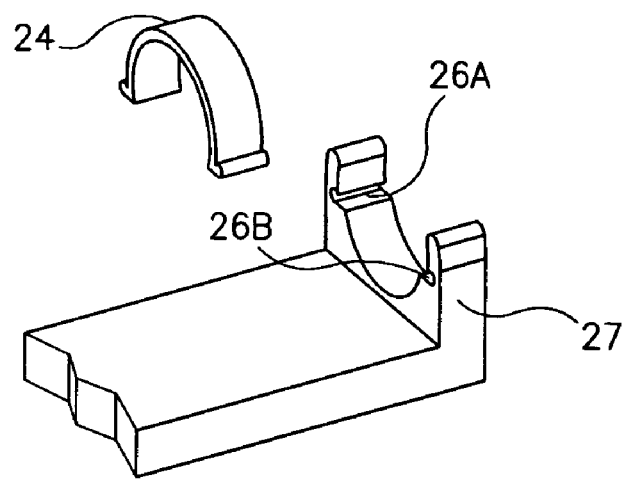
FIG. 3 is a close-up view of an alternative cylindrical level vial retaining arrangement in accordance with the present invention.

While the invention has been described with respect to a limited number of embodiments, it will be appreciated that many variations, modifications, and other applications of the invention can be made within the scope of the appended claims. For example, an Ω shaped retainer clip 24 can be employed for sliding insertion into a pair of cutouts 26A and 26B formed on either side of a semi-cylindrical vial support 27 (see FIG. 3).

The invention claimed is:

1. A hand tool with spirit level functionality comprising:
   (a) a plastic molded web having a recess defined by a peripheral wall with a pair of opposite vial supports, each said vial support having a lower lug and an upper lug, said vial supports and said lugs being integrally molded with said peripheral wall;
   (b) a cylindrical level vial that can be snugly received lengthwise and diameterwise by said lugs; and
   (c) a pair of annular retainer clips that can be slidingly displaced along said level vial,
       each said retainer clip having a pair of diametrically opposite notches so as to provide a sliding mounting on a corresponding one of said vial supports,
       each said upper lug and said lower lug of each of said pair of vial supports terminating in a widened tip,
       and each notch of said pair of retainer clips having a narrow neck which widens into a horseshoe shaped recess such that a retainer clip can be snap fitted onto a corresponding one of said lugs of said vial supports so as to securely mount said level vial in said web.

2. A spirit level comprising:
   (a) a plastic molded web having a recess defined by a peripheral wall with a pair of opposite vial supports, each said vial support having a lower lug and an upper lug, said vial supports and said lugs being integrally molded with said peripheral wall;

(b) a cylindrical level vial that can be snugly received lengthwise and diameterwise by said lugs; and (c) a pair of annular retainer clips that can be slidingly displaced along said level vial, each said retainer clip having a pair of diametrically opposite notches so as to provide a sliding mounting on a corresponding one of said vial supports, each said upper lug and said lower lug of each of said pair of vial supports terminating in a widened tip, and each notch of said pair of retainer clips having a narrow neck which widens into a horseshoe shaped recess such that a retainer clip can be snap fitted onto a corresponding one of said lugs of said vial supports so as to securely mount said level vial in said web.

* * * * *